US011597180B2

(12) United States Patent
Wada et al.

(10) Patent No.: US 11,597,180 B2
(45) Date of Patent: Mar. 7, 2023

(54) COMPOSITE MATERIAL FOR VEHICLES

(71) Applicants: SEIREN CO., LTD., Fukui (JP); TOYOTA BOSHOKU KABUSHIKI KAISHA, Kariya (JP)

(72) Inventors: Naohiro Wada, Fukui (JP); Hayato Wakatsuki, Anjo (JP); Toshio Nakamura, Nagoya (JP)

(73) Assignees: SEIREN CO., LTD., Fukui (JP); TOYOTA BOSHOKU KABUSHIKI KAISHA, Kariya (JP)

(*) Notice: Subject to any disclaimer, the term of this patent is extended or adjusted under 35 U.S.C. 154(b) by 364 days.

(21) Appl. No.: 16/906,307

(22) Filed: Jun. 19, 2020

(65) Prior Publication Data
US 2020/0398522 A1 Dec. 24, 2020

(30) Foreign Application Priority Data

Jun. 20, 2019 (JP) .............................. JP2019-114504

(51) Int. Cl.
B32B 5/24 (2006.01)
B60N 2/58 (2006.01)
D03D 1/00 (2006.01)
B32B 27/40 (2006.01)
D03D 13/00 (2006.01)

(52) U.S. Cl.
CPC .............. *B32B 5/245* (2013.01); *B32B 27/40* (2013.01); *B60N 2/5883* (2013.01); *D03D 1/00* (2013.01); *D03D 13/008* (2013.01)

(58) Field of Classification Search
CPC ....... B32B 5/245; B32B 27/40; B60N 2/5883; D03D 1/00; D03D 13/008

USPC ....................................................... 297/452.6
See application file for complete search history.

(56) References Cited

U.S. PATENT DOCUMENTS

2019/0351646 A1* 11/2019 Yoshimura .............. B32B 5/024
2021/0214886 A1* 7/2021 Hussey ................... B32B 5/024

FOREIGN PATENT DOCUMENTS

| CN | 205368630 U | 7/2016 |
| JP | 2014-184607 A | 10/2014 |
| JP | 2018-102711 A | 7/2018 |

OTHER PUBLICATIONS

Chinese Office Action issued in Chinese Patent Application No. 202010520605.9 dated Mar. 28, 2022.

* cited by examiner

*Primary Examiner* — Mark R Wendell
(74) *Attorney, Agent, or Firm* — Pearne & Gordon LLP

(57) ABSTRACT

Provided is a composite material for vehicles capable of substantially preventing the occurrence of wrinkles caused by ease stitching. This composite material for vehicles is a layered product of a skin material and a polyurethane foam sheet. The skin material has a play structure which, when the composite material for vehicles is stitched, allows the skin material to follow deformation caused by the stitching with a smooth state of a surface of the skin material maintained. The skin material is a woven fabric including warp yarns and weft yarns. The warp yarns and/or the weft yarns include two or more types of yarns having different total finenesses, and form the play structure.

8 Claims, 2 Drawing Sheets

■ Warp ☐ Weft

Weave A

Weave E

Weave B

Weave F

Weave C

Weave G

Weave D

Weave 1

Weave 2

Weave 3

COMPOSITE MATERIAL FOR VEHICLES

BACKGROUND

The present disclosure relates to a composite material for vehicles that a layered product of a skin material and a polyurethane foam sheet.

Skin materials for vehicle seats and the like are required to be durable, and therefore, a material therefor is processed, without being directly used, into various forms, which are used as a composite material. In the case where a woven fabric is used as the s kin material of such a composite material for vehicles, a backing process of applying a resin to the back surface of the woven fabric has been conventionally performed in order to prevent the woven fabric from fraying. However, as increasing attention has been focused on the reduction of impacts on the environment of the earth, it is important to reduce the weight of a vehicle, which directly leads to a reduction in carbon dioxide discharged from the vehicle. There is also a demand for a further reduction in the weight of composite materials for vehicles.

For example, there is a composite material for vehicles that does not require a conventional backing process and therefore has a reduced weight (Japanese Unexamined Patent Application Publication No. 2014-184607). In a composite material for vehicles disclosed in Japanese Unexamined Patent Application Publication No. 2014-184607, a polyurethane foam sheet is layered on a woven fabric as a skin material, and therefore, threads of the surface of the woven fabric are substantially prevented from fraying without a backing process, and strength and durability suitable for a composite material for vehicles are achieved.

Incidentally, when a composite material for vehicles is stitched into a three-dimensional shape that fits the shape of a seat, "ease stitching" is used in which stitching is performed while one of two composite materials having different lengths is contracted with the two composite materials put on top of each other. In ease stitching, as the reduction ratio (hereinafter referred to as a "easing ratio") by which the original size of a composite material to be eased is reduced to a size after easing increases, the finished three-dimensional shape is more round, and the skin material of the contracted one of the composite materials is more likely to distort and wrinkle.

Appearance is important in vehicle interior applications. Therefore, composite materials for vehicles are required to have properties that the material can be stitched into a three-dimensional shape by ease stitching having a great easing ratio, and at the same time, is less likely to wrinkle irrespective of easing. However, the composite material for vehicles disclosed in Japanese Unexamined Patent Application Publication No. 2014-184607 is mainly aimed at achieving light weight and durability, and the occurrence of wrinkles caused by ease stitching is not therein taken into consideration.

SUMMARY

With the above in mind, the present disclosure describes implementations of a composite material for vehicles capable of substantially preventing the occurrence of wrinkles caused by ease stitching.

An example composite material for vehicles according to the present disclosure is a layered product of a skin material and a polyurethane foam sheet. The skin material has a play structure which, when the composite material for vehicles is stitched, allows the skin material to follow deformation caused by the stitching with a smooth state of a surface of the skin material maintained.

When the example composite material for vehicles is ease-stitched on another composite material, the play structure of the skin material allows the skin material to follow deformation caused by the stitching with a smooth state of a surface of the skin material maintained. When the second composite material is contracted by ease stitching that fits a curved shape of a seat or the like, the play structure can accommodate distortion of the skin material, and therefore, the occurrence of wrinkles is substantially prevented.

In the example composite material for vehicles according to the present disclosure, the skin material is preferably a woven fabric including warp yarns and weft yarns, and the warp yarns and/or the weft yarns preferably include two or more types of yarns having different total finenesses, and form the play structure.

In the example composite material for vehicles, the skin material is a woven fabric including warp yarns and weft yarns, and the warp yarns and/or the weft yarns include two or more types of yarns having different total finenesses, and therefore, a play structure is formed between adjacent yarns having different total finenesses. Therefore, the play structure can appropriately accommodate distortion of the skin material caused by ease stitching.

In the example composite material for vehicles according to the present disclosure, the warp yarns preferably have a total fineness of 150-300 denier, and the weft yarns preferably have a total fineness of 100-450 denier.

In the example composite material for vehicles, the total finenesses of the warp and weft yarns are in the above respective ranges. Therefore, the skin material is a thick woven fabric having a play structure, and therefore, occurrence of wrinkles caused by ease stitching can be more appropriately prevented or reduced.

In the example composite material for vehicles according to the present disclosure, the difference between the maximum and minimum values of the different total finenesses of the two or more types of yarns included in the warp yarns is preferably 50 denier or more, and the difference between the maximum and minimum values of the different total finenesses of the two or more types of yarns included in the weft yarns is preferably 100 denier or more.

In the example composite material for vehicles, the difference between the maximum and minimum values of the different total finenesses of the warp yarns, and the difference between the maximum and minimum values of the different total finenesses of the weft yarns, are in the above respective ranges. Therefore, a play structure is appropriately formed between yarns having different total finenesses, and therefore, the play structure can appropriately accommodate distortion of the skin material caused by ease stitching.

In the example composite material for vehicles according to the present disclosure, the warp yarns preferably have a product density of 70-250 yarns/25.4 mm, and the weft yarns preferably have a product density of 55-160 yarns/25.4 mm.

In the example composite material for vehicles, the product densities of the warp and weft yarns are in above respective ranges. Therefore, the space between adjacent yarns is suitable for formation of a play structure.

In the example composite material for vehicles according to the present disclosure, the warp yarns and/or the weft yarns preferably have a float length of 10 or less.

In the example composite material for vehicles, the float length of the yarns is in the above range. Therefore, the yarns are allowed to have appropriate play properties, and therefore, strength and durability suitable for vehicle interior can be maintained.

In the example composite material for vehicles according to the present disclosure, the warp yarns and/or the weft yarns are preferably an interlaced yarn.

In the example composite material for vehicles, the warp yarns and/or the weft yarns are an interlaced yarn. Therefore, a large play structure is formed between adjacent yarns, and therefore, the occurrence of wrinkles can be more appropriately prevented or reduced.

DETAILED DESCRIPTION

Figure 1:
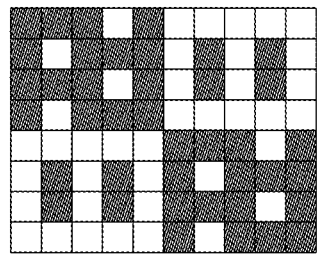
FIG. 1 is a diagram showing two-layer weaves used in Examples 1-10.
Figure 1:
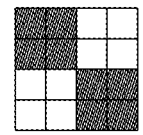
Figure 1:
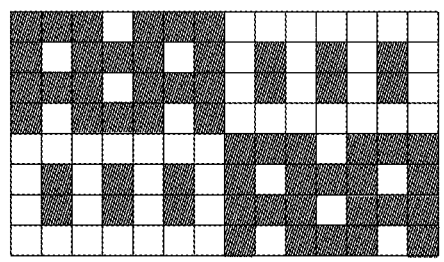
Figure 1:
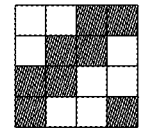
Figure 1:
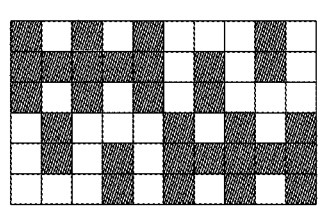
Figure 1:
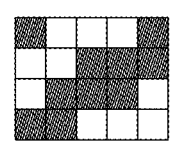
Figure 1:
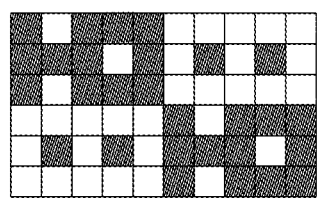

An example composite material for vehicles according to the present disclosure will now be described. It should be noted that the present disclosure is not intended to be limited to configurations described below.

An example composite material for vehicles according to present disclosure is obtained by layering a polyurethane foam sheet as a backing material on a back surface of a skin material and thereby integrating the backing material and the skin material together.

[Skin Material]

The skin material has a play structure that, when the composite material for vehicles is ease-stitched, allows the skin material to follow deformation caused by the stitching while maintaining a smooth state of a surface thereof. As used herein, the term "smooth state" with respect to a surface means that there is substantially no visible unevenness such as wrinkles and folds on the surface. Even when there is fine unevenness such as fiber lattices derived from material structure and pores derived from porous structure, then if it can be visually determined that a material is generally smooth, it is considered that the material has a smooth state. As used herein, the term "play structure" means a structure or tissue (so-called "play") that allows the structure or tissue of a material to move or deform within a predetermined range with a relative positional relationship substantially maintained. The composite material for vehicles according to the present disclosure includes a skin material having a play structure, which can accommodate distortion of the skin material caused by ease stitching, resulting in an improvement in properties of substantially preventing the occurrence of wrinkles (hereinafter referred to as "easing properties"). Examples of the skin material include cloths, such as woven fabric, knitted fabric, and nonwoven fabric. In particular, woven fabric is preferable. Examples of the weave of woven fabric include three foundation weave, i.e., plain weave, twill weave, and sateen weave, modifications of three foundation weave, special weaves such as crepe weave, mixed weaves which are a combination thereof, and multilayer weaves such as two-layer weaves and three-layer weaves. In particular, two-layer weaves are preferable because thick woven fabric is easily obtained. In addition, in weaves, the number of floating yarns forming a longest float (hereinafter referred to as a "maximum float length") is preferably 2-10 in warp and/or weft. If the maximum float length is in the above range, appropriate yarn play properties can be achieved, and therefore, strength and durability suitable for vehicle interior can be maintained. If the maximum float length is one, yarns are not easily moved, and therefore, sufficient easing properties are not likely to be obtained. If the maximum float length is more than 10, yarn play properties are excessively great, and therefore, the strength and durability of a composite material for vehicle interior is likely to be insufficient. Note that the term "float" with respect to a yarn refers to the length of a yarn continuously appearing on the front surface of woven fabric, i.e., a float portion of a yarn which so-called "floats and sinks." The woven fabric preferably has a thickness of 0.5 mm or more. If the thickness is 0.5 mm or more, a play structure can be easily formed in the woven fabric, and therefore, excellent easing properties can be imparted to the composite material for vehicles. If the thickness of the woven fabric is less than 0.5 mm, a play structure may not be formed in the woven fabric, and therefore, sufficient easing properties are not likely to be obtained.

In the woven fabric, the product density of warp yarns (the number of warp yarns present in a space of 25.4 mm in the weft direction) is preferably 70-250 yarns/25.4 mm, more preferably 70-220 yarns/25.4 mm. The product density of weft yarns (the number of weft yarns present in a space of 25.4 mm in the warp direction) is preferably 55-160 yarns/25.4 mm, more preferably 55-100 yarns/25.4 mm. If the product density of warp yarns and/or weft yarns is in the above range, strength and durability suitable for vehicle interior can be obtained, and in addition, the space between adjacent yarns is wide, and therefore, a play structure having high yarn play properties can be formed. If the product density of warp yarns is less than 70 yarns/25.4 mm or if the product density of weft yarns is less than 55 yarns/25.4 mm, sufficient strength and durability are not likely to be obtained. If the product density of warp yarns is more than 250 yarns/25.4 mm or if the product density of weft yarns is more than 160 yarns/25.4 mm, the space between adjacent yarns is narrow, and therefore, a play structure is not likely to be formed.

The fineness (total fineness) of warp yarns is preferably 150-300 denier. The fineness (total fineness) of weft yarns is preferably 100-450 denier. If the total fineness of yarns is in the above ranges, a woven fabric having a thickness that allows easy formation of a play structure is obtained. In addition, such a thick woven fabric is suitable for vehicle interior in terms of strength and durability. If the total fineness of warp yarns is less than 150 denier or if the total fineness of weft yarns is less than 100 denier, the woven fabric is not likely to have a sufficient play structure. If the total fineness of warp yarns is more than 300 denier or if the total fineness of weft yarns is more than 450 denier, the woven fabric is excessively thick, and therefore, is likely to have inappropriate texture.

The warp yarns and/or the weft yarns preferably include two or more types of yarns having different total finenesses. If the warp yarns include two or more types of yarns having different total finenesses and/or if the weft yarns include two or more types of yarns having different total finenesses, the space between adjacent yarns having different total finenesses serves as a play structure, and therefore, the composite material for vehicles can have excellent easing properties. The difference between the greatest and smallest total finenesses of the warp yarns is preferably 50 denier or more, more preferably 150 denier or more. If the difference between the greatest and smallest total finenesses of the warp yarns is in the above range, a large play structure is formed between the warp yarns having different total finenesses, and therefore, the composite material for vehicles has more excellent easing properties. The upper limit value of the difference between the greatest and smallest total finenesses of the warp yarns is not particularly limited, and may be 300 denier or less. The difference between the greatest and smallest total finenesses of the weft yarns is preferably 100 denier or more, more preferably 150 denier or more. If the difference between the greatest and smallest total finenesses of the weft yarns is in the above range, a large play structure is formed between the weft yarns having different total finenesses, and therefore, the composite material for vehicles has more excellent easing properties. The upper limit value of the difference between the greatest and smallest total finenesses of the weft yarns is not particularly limited, and may be 300 denier or less. In addition, the warp yarns and the weft yarns preferably have different total finenesses. If the warp yarns and the weft yarns have different total finenesses, a play structure is formed that allows a warp yarn and a weft yarn to easily move with respect to each other at an intersection thereof, and therefore, the composite material for vehicles can have excellent easing properties.

The warp yarns and/or the weft yarns used in the woven fabric are preferably a multifilament yarn. The multifilament yarn may be optionally twisted, or may be treated by a false-twisting process, a fluid disturbance process (taslan process, interlacing, or the like), or the like, to be crimped or bulked. In particular, in order to allow the woven fabric to have a play structure, an interlaced yarn is more preferably used, and an interlaced yarn having 80-120 entanglement points per meter (hereinafter referred to as a "strongly interlaced yarn") is even more preferably used in terms of durability. If an interlaced yarn is used as a warp yarn and/or a weft yarn of the woven fabric, a large play structure is formed between adjacent yarns, and therefore, the occurrence of wrinkles can be more appropriately prevented or reduced. In addition, the yarn may be a composite yarn including two or more types of fibers, which may be combined by mixing, doubling, doubling and twisting, twisting, winding, or the like.

A material for fibers (monofilaments) constituting the yarn is not particularly limited, and may be, for example, natural fibers, regenerated fibers, semisynthetic fibers, synthetic fibers, or the like. Of them, synthetic fibers are preferable in terms of mechanical strength, heat resistance, and light resistance, more preferably polyester, and even more preferably polyethylene terephthalate. In addition, composite fibers including a combination of two or more of them may be used. In addition, fibers having a function may be used, such as conventionally known functional fibers having flame retardancy, electrical conductivity, deodorizing ability, or the like. For example, in the case where high flame retardancy is required, flame retardant fibers can be used. The cross-sectional shape of the fiber is not particularly limited, and the shape of the fiber may be not only an ordinary round shape but also an atypical shape such as a flat shape, an elliptical shape, a triangular shape, a hollow shape, a Y shape, a T shape, or a U shape. Furthermore, the surface of the fiber may have fine unevenness (called "microcraters").

The fineness (monofilament fineness) of the fiber is preferably 0.27-9 denier, more preferably 0.27-4.5 denier. If the fineness is less than 0.27 denier, sufficient durability, particularly light resistance, is not likely to be obtained. If the fineness is more than 9 denier, the surface resistance value of the yarn decreases, and sufficient durability is not likely to be obtained, or texture is likely to be hardened.

[Polyurethane Foam Sheet]

In the composite material for vehicles according to the present disclosure, the polyurethane foam sheet layered on the back surface of the skin material may be a backing material that is commonly used for a skin material in vehicle interior applications. For example, the polyurethane foam sheet may be a long sheet obtained by slicing a block continuously produced from soft slab foam in a longitudinal direction thereof. The polyurethane foam sheet may be layered by any suitable method, such as using an adhesive or by flame lamination. Of them, flame lamination is preferable in terms of process loads and weight reduction. As a result, in the composite material for vehicles according to the present disclosure, the skin material can be substantially prevented from fraying, without a backing process, and is free from hard texture, and in addition, has sufficient strength and durability.

The easing properties of the composite material for vehicles can be assessed using the maximum value of an easing ratio at which the occurrence of wrinkles is not visually observed (hereinafter referred to as a "maximum easing ratio"). In a method for calculating the maximum easing ratio, test specimens having a width of 50 mm and a length of 100 mm are sampled in the warp and weft directions, and the length across which each test specimen is stitched on another composite material (hereinafter referred to as a "stitch length") is contracted, i.e., ease stitching is performed. The maximum easing ratio is calculated by:

$$\text{maximum easing ratio (\%)} = \{(L_0 - L_1)/L_0\} \times 100 \tag{1}$$

where $L_0$ represents the length of a test specimen before stitching, and $L_1$ represents the minimum stitch length at which the occurrence of wrinkles is not visually observed in the test specimen after ease stitching.

EXAMPLES

Example composite materials for vehicles according to the present disclosure (Examples 1-25) were measured and assessed in terms of various items. The items measured and assessed were maximum easing ratio, surface abrasion resistance, snagging resistance, and strip modulus. Each item will now be described.

[Maximum Easing Ratio]

Test specimens having a width of 50 mm and a length of 100 mm were sampled in the warp and weft directions, and the length across which each test specimen was stitched on another composite material (hereinafter referred to as a "stitch length") was contracted, i.e., ease stitching was performed. After the ease stitching, the minimum stitch length at which the occurrence of wrinkles was not visually observed for each test specimen was measured, and the maximum easing ratio was calculated by the above expression (1).

[Surface Abrasion Resistance]

A test specimen having a width of 70 mm and a length of 300 mm was sampled in each of the warp and weft directions, and was fixed to a surface abrasion tester (T-Type, manufactured by DAIEI KAGAKU SEIKI MFG. Co., Ltd.) with a urethane foam sheet having a width of 70 mm, a length of 300 mm, and a thickness of 10 mm put on the back surface of the test specimen. The surface of the test specimen was abraded using a friction block covered by cotton cloth (cotton sail cloth), where a load of 9.8 N was applied to the friction block, and the friction block was reciprocated across 140 mm 10,000 times at a speed of 60 round trips/min. In this test, cotton cloth was replaced every 2500 round trips of reciprocating abrasion. The test specimen after abrasion was observed and assessed according to the following criteria.

Grade 5: no change in surface conditions
Grade 4: slightly fuzzy
Grade 3: fuzzy
Grade 2: very fuzzy, and yarns were thinner
Grade 1: yarns were broken

[Snagging Resistance]

Measurement was performed in accordance with JIS L 1058 7.1 ICI mace type tester method (A-method). The number of revolutions of a drum was 500. A test specimen after the test was observed, and compared with the standard sample of ICI to determine the grade.

[Strip Modulus]

A test specimen having a width of 55 mm and a length of 250 mm was sampled in each of the warp and weft directions, the same number of yarns were removed from the opposite ends in the width direction so that the width was reduced to 50 mm. The test specimen was attached to a tensile tester autograph (AG-100A, manufactured by Shimadzu Corporation) without slack, where the arab width was 150 mm. The test specimen was extended at a speed of elongation of 200 mm/min, and the load at 5% elongation (N/50 mm) was measured. The measurement was performed three times, and the average of the resultant values was used as a modulus value.

Examples 1-10

Woven fabrics having a two-layer weave shown in FIG. 1 were used as a skin material. A polyurethane foam sheet was layered as a backing material on the back surface of each woven fabric by flame lamination under conditions described in Table 1 below, to obtain composite materials for vehicles of Examples 1-10. The polyurethane foam sheet after layering had a thickness of 1.3 mm. In the composite materials for vehicles of Examples 1-10, all of the woven fabrics used as a skin material had a wide space between adjacent yarns, which provided a play structure.

In the woven fabric used as a skin material in the composite material for vehicles of Example 1, a 2H twisted yarn of 167 dtex/48 f×2 (300 denier) and a twisted yarn of 167 dtex/48 f (150 denier) were alternately used as a warp yarn, and a 2H twisted yarn of 167 dtex/48 f×2 (300 denier) was used as a weft yarn. The on-machine density of warp yarns was 124 yarns/25.4 mm, and the on-machine density of weft yarns was 69 yarns/25.4 mm. The woven fabric had a weave A shown in FIG. 1. In the weave A, the maximum float length of warp yarns was four, and the maximum float length of weft yarns was five. In the woven fabric thus obtained, the product density of warp yarns was 145 yarns/ 25.4 mm, and the product density of weft yarns was 85 yarns/25.4 mm.

The woven fabrics used as a skin material in the composite materials for vehicles of Examples 2 and 3 were similar to that of Example 1, except that the woven fabrics of Examples 2 and 3 had a weave B and a weave C, respectively, shown in FIG. 1, which are different from that of Example 1. In the weave B, the maximum float length of warp yarns was four, and the maximum float length of weft yarns was seven. In the weave C, the maximum float length of warp yarns was three, and the maximum float length of weft yarns was three. In the woven fabric thus obtained of Example 2, the product density of warp yarns was 151 yarns/25.4 mm, and the product density of weft yarns was 86 yarns/25.4 mm. In Example 3, the product density of warp yarns was 148 yarns/25.4 mm, and the product density of weft yarns was 90 yarns/25.4 mm.

In the woven fabric used as a skin material in the composite material for vehicles of Example 4, a 2H twisted yarn of 167 dtex/48 f×2 (300 denier) and a twisted yarn of 167 dtex/48 f (150 denier) were alternately used as a warp yarn, and a 2H twisted yarn of 167 dtex/48 f×2 (300 denier) was used as a weft yarn. The on-machine density of warp yarns was 124 yarns/25.4 mm, and the on-machine density of weft yarns was 69 yarns/25.4 mm. The woven fabric had a weave D shown in FIG. 1. In the weave D, the maximum float length of warp yarns was three, and the maximum float length of weft yarns was five. In the woven fabric thus obtained, the product density of warp yarns was 151 yarns/ 25.4 mm, and the product density of weft yarns was 85 yarns/25.4 mm.

The woven fabric used as a in material in the composite material for vehicles of Example 5 was similar to that of Example 4, except that in the woven fabric of Example 5, the on-machine density of warp yarns was 112 yarns/25.4 mm, and the on-machine density of weft yarns was yarns/25.4 mm. In the woven fabric thus obtained, the product density of warp yarns was 138 yarns/25.4 mm, and the product density of weft yarns was 77 yarns/25.4 mm.

The woven fabric used as a skin material in the composite material for vehicles of Example 6 was similar to that of Example 5, except that in the woven fabric of Example 6, an SD2H strongly interlaced yarn of 167 dtex/48 f×2 (300 denier) and an SD2H strongly interlaced yarn of 167 dtex/48 f (150 denier) were alternately used as a warp yarn, and an SD2H strongly interlaced yarn of 167 dtex/48 f×2 (300 denier) was used as a weft yarn. In the woven fabric thus obtained, the product density of warp yarns was 139 yarns/ 25.4 mm, and the product density of weft yarns was 76 yarns/25.4 mm.

The woven fabric used as a skin material in the composite material for vehicles of Example 7 was similar to that of Example 6, except that in the woven fabric of Example 7, the on-machine density of warp yarns was 101 yarns/25.4 mm, and the on-machine density of weft yarns was 56 yarns/25.4 mm. In the woven fabric thus obtained, the product density of warp yarns was 125 yarns/25.4 mm, and the product density of weft yarns was 70 yarns/25.4 mm. In the woven fabric used as a skin material in the composite material for vehicles of Example 8, an SD2H strongly interlaced yarn of 167 dtex/48 f×2 (300 denier) was used as a warp yarn, and an SD2H strongly interlaced yarn of 167 dtex/48 f×2 (300 denier) was used as a weft yarn. The on-machine density of warp yarns and the on-machine density of weft yarns were 70 yarns/25.4 mm. The woven fabric had a weave E shown in FIG. 1. In the weave E, the maximum float length of warp yarns was two, and the maximum float length of weft yarns was two. In the woven fabric thus obtained, the product density of warp yarns was 83 yarns/25.4 mm, and the product density of weft yarns was 85 yarns/25.4 mm.

The woven fabrics used as a skin material in the composite materials for vehicles of Examples 9 and 10 were similar to that of Example 8, except that the woven fabrics of Examples 9 and 10 had a weave and a weave G, respectively, shown in FIG. 1, which are different from that of Example 8 In the weave F, the maximum float length of warp yarns was two, and the maximum float length of weft yarns was two. In the weave G, the maximum float length of warp yarns was two, and the maximum float length of weft yarns was three. In the woven fabric thus obtained of Example 9, the product density of warp yarns was 84 yarns/25.4 mm, and the product density of weft yarns was 80 yarns/25.4 mm. In the woven fabric thus obtained of Example 10, the product density of warp yarns was 85 yarns/25.4 mm, and the product density of weft yarns was 80 yarns/25.4 mm.

Examples 11-25

Figure 2:
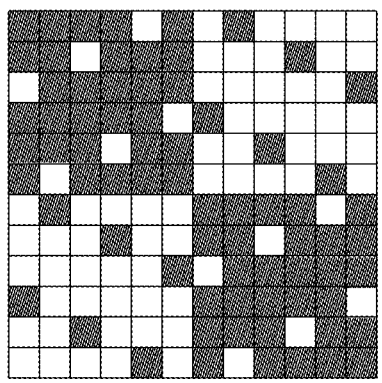
FIG. 2 is a diagram showing single-layer weaves used in Examples 11-25.
Figure 2:
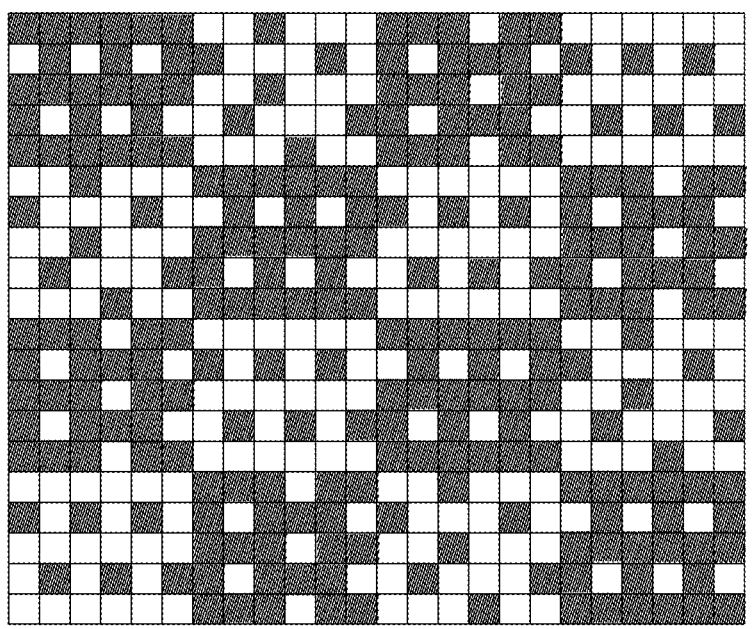
Figure 2:
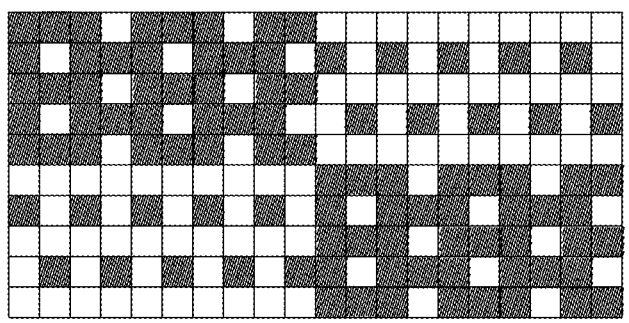

Woven fabrics having a single-layer weave shown in FIG. 2 were used as a skin material. A polyurethane foam sheet was layered as a backing material on the back surface of each woven fabric by flame lamination under conditions described in Table 2 below, to obtain composite materials for vehicles of Examples 11-25. The polyurethane foam sheet after layering had a thickness of 1.3 mm. In the composite materials for vehicles of Examples 11-25, all of the woven fabrics used as a skin material had a wide space between adjacent yarns, which provided a play structure.

In the woven fabric used as a skin material in the composite material for vehicles of Example 11, a twisted yarn of 167 dtex/48 f (150 denier) was used as a warp yarn, and a twisted yarn of 167 dtex/48 f (150 denier) was used as a weft yarn. The on-machine density of warp yarns and the on-machine density of weft yarns were 75 yarns/25.4 mm. The woven fabric had a weave 1 shown in FIG. 2. In the weave 1, the maximum float length of warp yarns was five, and the maximum float length of weft yarns was five. In the woven fabric thus obtained, the product density of warp yarns was 104 yarns/25.4 mm, and the product density of weft yarns was 91 yarns/25.4 mm.

The woven fabrics used as a skin material in the composite materials for vehicles of Examples 12-25 each had a yarn combination, on-machine density, and weave shown in Table 2 and FIG. 2, which are different from those of Example 11. Note that in a weave 3 used in Examples 14-17 and 21-24, the maximum float length of warp yarns was five, and the maximum float length of weft yarns was ten. In a weave 2 used in Example 25, the maximum float length of warp yarns was five, and the maximum float length of weft yarns was six. In the woven fabric thus obtained, in Example 12, the product density of warp yarns was 89 yarns/25.4 mm, and the product density of weft yarns was 89 yarns/25.4 mm. In Example 13, the product density of warp yarns was 191 yarns/25.4 mm, and the product density of weft yarns was 86 yarns/25.4 mm. In Example 14, the product density of warp yarns was 102 yarns/25.4 mm, and the product density of weft yarns was 91 yarns/25.4 mm. In Example 15, the product density of warp yarns was 117 yarns/25.4 mm, and the product density of weft yarns was 86 yarns/25.4 mm. In Example 16, the product density of warp yarns was 218 yarns/25.4 mm, and the product density of weft yarns was 91 yarns/25.4 mm. In Example 17, the product density of warp yarns was 206 yarns/25.4 mm, and the product density of weft yarns was 86 yarns/25.4 mm. In Example 18, the product density of warp yarns was 86 yarns/25.4 mm, and the product density of weft yarns was 90 yarns/25.4 mm. In Example 19, the product density of warp yarns was 97 yarns/25.4 mm, and the product density of weft yarns was 91 yarns/25.4 mm. In Example 20, the product density of warp yarns was 183 yarns/25.4 mm, and the product density of weft yarns was 69 yarns/25.4 mm. In Example 21, the product density of warp yarns was 104 yarns/25.4 mm, and the product density of weft yarns was 97 yarns/25.4 mm. In Example 22, the product density of warp yarns was 99 yarns/25.4 mm, and the product density of weft yarns was 86 yarns/25.4 mm. In Example 23, the product density of warp yarns was 203 yarns/25.4 mm, and the product density of weft yarns was 94 yarns/25.4 mm. In Example 24, the product density of warp yarns was 208 yarns/25.4 mm, and the product density of weft yarns was 72 yarns/25.4 mm. In Example 25, the product density of warp yarns was 145 yarns/25.4 mm, and the product density of weft yarns was 97 yarns/25.4 mm.

Note that in the composite materials for vehicles of Examples 1-25, all yarns included in the woven fabrics used as a skin material were a polyethylene terephthalate yarn.

The yarn combination, weave, on-machine density, product density, and thickness of each of the woven fabrics used as a skin material in the examples are shown in Tables 1 and 2. The results of measurement and assessment of each example are shown in Table 3 and 4.

TABLE 1

| Examples | Yarn combination | | Weave | On-machine density (yarns/25.4 mm) | | Product density (yarns/25.4 mm) | | Thickness (mm) |
| | Warp | Weft | | Warp | Weft | Warp | Weft | |
| --- | --- | --- | --- | --- | --- | --- | --- | --- |
| 1 | 167dtex/48f × 2 2H 167dtex/48f | 167dtex/48f × 2 2H | Weave A | 124 | 69 | 145 | 85 | 0.8 |
| 2 | 167dtex/48f × 2 2H 167dtex/48f | 167dtex/48f × 2 2H | Weave B | 124 | 69 | 151 | 86 | 0.8 |
| 3 | 167dtex/48f × 2 2H 167dtex/48f | 167dtex/48f × 2 2H | Weave C | 124 | 69 | 148 | 90 | 0.8 |
| 4 | 167dtex/48f × 2 2H 167dtex/48f | 167dtex/48f × 2 2H | Weave D | 124 | 69 | 151 | 85 | 0.8 |
| 5 | 167dtex/48f × 2 2H 167dtex/48f | 167dtex/48f × 2 2H | Weave D | 112 | 62 | 138 | 77 | 0.8 |
| 6 | 167dtex/48f × 2 SD2H strongly interlaced 167dtex/48f SD2H strongly interlaced | 167dtex/48f × 2 SD2H strongly interlaced — | Weave D | 112 | 62 | 139 | 76 | 0.8 |
| 7 | 167dtex/48f × 2 SD2H strongly interlaced 167dtex/48f SD2H strongly interlaced | 167dtex/48f × 2 SD2H strongly interlaced — | Weave D | 101 | 56 | 125 | 70 | 0.9 |
| 8 | 167dtex/48f × 2 SD2H strongly interlaced — | 167dtex/48f × 2 SD2H strongly interlaced — | Weave E | 70 | 70 | 83 | 85 | 0.6 |

TABLE 1-continued

| Examples | Yarn combination Warp | Weft | Weave | On-machine density (yarns/25.4 mm) Warp | Weft | Product density (yarns/25.4 mm) Warp | Weft | Thickness (mm) |
|---|---|---|---|---|---|---|---|---|
| 9 | 167dtex/48f × 2 SD2H strongly interlaced — | 167dtex/48f × 2 SD2H strongly interlaced — | Weave F | 70 | 70 | 84 | 80 | 0.6 |
| 10 | 167dtex/48f × 2 SD2H strongly interlaced — | 167dtex/48f × 2 SD2H strongly interlaced — | Weave G | 70 | 70 | 85 | 80 | 0.7 |

TABLE 2

| Examples | Yarn combination Warp | Weft | Weave | On-machine density (yarns/25.4 mm) Warp | Weft | Product density (yarns/25.4 mm) Warp | Weft | Thickness (mm) |
|---|---|---|---|---|---|---|---|---|
| 11 | 167dtex/48f | 167dtex/48f | Weave 1 | 75 | 75 | 104 | 91 | 0.7 |
| 12 | 167dtex/48f | 167dtex/48f × 3 | Weave 1 | 75 | 75 | 89 | 89 | 0.7 |
| 13 | 167dtex/48f | 167dtex/48f × 3 | Weave 1 | 168 | 72 | 191 | 86 | 0.6 |
| 14 | 167dtex/48f | 167dtex/48f | Weave 3 | 75 | 75 | 102 | 91 | 0.9 |
| 15 | 167dtex/48f | 167dtex/48f × 3 | Weave 3 | 75 | 75 | 117 | 86 | 1.5 |
| 16 | 167dtex/48f | 167dtex/48f | Weave 3 | 168 | 75 | 218 | 91 | 0.8 |
| 17 | 167dtex/48f | 167dtex/48f × 3 | Weave 3 | 168 | 75 | 206 | 86 | 0.9 |
| 18 | 167dtex/48f × 2 2H | 167dtex/48f | Weave 1 | 75 | 75 | 86 | 90 | 0.7 |
| 19 | 167dtex/48f × 2 2H | 167dtex/48f × 3 | Weave 1 | 75 | 75 | 97 | 91 | 0.9 |
| 20 | 167dtex/48f × 2 2H | 167dtex/48f × 3 | Weave 1 | 168 | 57 | 183 | 69 | 1.0 |
| 21 | 167dtex/48f × 2 2H | 167dtex/48f | Weave 3 | 75 | 75 | 104 | 97 | 1.1 |
| 22 | 167dtex/48f × 2 2H | 167dtex/48f × 3 | Weave 3 | 75 | 75 | 99 | 86 | 1.2 |
| 23 | 167dtex/48f × 2 2H | 167dtex/48f | Weave 3 | 168 | 75 | 203 | 94 | 1.0 |
| 24 | 167dtex/48f × 2 2H | 167dtex/48f × 3 | Weave 3 | 168 | 57 | 208 | 72 | 1.1 |
| 25 | 84dtex/36f × 3 | 167dtex/48f × 2 2H | Weave 2 | 122 | 75 | 145 | 97 | 0.9 |

TABLE 3

| Examples | Maximum easing ratio (%) Warp direction | Weft direction | Resistance Surface abrasion (grade) Warp direction | Weft direction | Snagging (grade) Warp direction | Weft direction | Strip modulus (N/50 mm) Warp direction | Weft direction |
|---|---|---|---|---|---|---|---|---|
| 1 | 5 | 3 | 4 | 4 | 2.5 | 4 | 18.5 | 54.8 |
| 2 | 3 | 3 | 4 | 4 | 4 | 2.5 | 23.8 | 24.9 |
| 3 | 7 | 5 | 4 | 4 | 4.5 | 3.5 | 23.8 | 31.8 |
| 4 | 5 | 5 | 4 | 4 | 3 | 3 | 17.3 | 23.8 |
| 5 | 5 | 7 | 4 | 4 | 3 | 2.5 | 20.6 | 12.3 |
| 6 | 7 | 7 | 4 | 4 | 4 | 3.5 | 21.8 | 13.6 |
| 7 | 7 | 7 | 4 | 4 | 2.5 | 2.5 | 15.2 | 8.8 |
| 8 | 3 | 5 | 4 | 4 | 4.5 | 4.5 | 13.4 | 16.8 |
| 9 | 3 | 3 | 4 | 4 | 4.5 | 4.5 | 14.7 | 13.7 |
| 10 | 3 | 5 | 4.5 | 4 | 4.5 | 4 | 17.4 | 9.9 |

TABLE 4

| Examples | Maximum easing ratio (%) Warp direction | Weft direction | Resistance Surface abrasion (grade) Warp direction | Weft direction | Snagging (grade) Warp direction | Weft direction | Strip modulus (N/50 mm) Warp direction | Weft direction |
|---|---|---|---|---|---|---|---|---|
| 11 | 4 | 7 | 4 | 4 | 2.5 | 2 | 14.1 | 3.9 |
| 12 | 3 | 3 | 4 | 4 | 3.5 | 2.5 | 21.8 | 15.7 |
| 13 | 5 | 4 | 3.5 | 3.5 | 1.5 | 1 | 20.1 | 4.7 |
| 14 | 4 | 8 | 4 | 4 | 3 | 4.5 | 46.4 | 107.0 |
| 15 | 5 | 8 | 4 | 4 | 4 | 4.5 | 44.8 | 124.9 |

TABLE 4-continued

| | Maximum easing ratio (%) | | Resistance | | | | | |
|---|---|---|---|---|---|---|---|---|
| | | | Surface abrasion (grade) | | Snagging (grade) | | Strip modulus (N/50 mm) | |
| Examples | Warp direction | Weft direction | Warp direction | Weft direction | Warp direction | Weft direction | Warp direction | Weft direction |
| 16 | 6 | 6 | 3.5 | 3.5 | 1 | 1 | 20.5 | 7.2 |
| 17 | 6 | 6 | 3.5 | 4 | 2 | 3.5 | 35.8 | 31.0 |
| 18 | 3 | 3 | 4 | 4.5 | 2.5 | 3.5 | 14.0 | 62.6 |
| 19 | 6 | 6 | 4 | 4 | 3 | 3 | 20.8 | 58.6 |
| 20 | 4 | 2 | 3.5 | 4 | 2.5 | 1.5 | 20.4 | 15.4 |
| 21 | 8 | 8 | 4 | 4.5 | 2 | 4 | 24.3 | 62.4 |
| 22 | 8 | 8 | 4 | 4 | 3.5 | 4.5 | 47.8 | 313.7 |
| 23 | 5 | 6 | 4 | 4 | 2 | 3.5 | 31.6 | 48.2 |
| 24 | 4 | 6 | 4 | 3.5 | 2 | 2.5 | 25.7 | 33.0 |
| 25 | 6 | 3 | 3.5 | 4 | 2 | 4 | 10.3 | 72.6 |

In the composite materials for vehicles of Examples 1-25, it was observed that the maximum easing ratio in the warp direction was 3% or more, i.e., excellent easing properties. This suggests that when the composite materials for vehicles of Examples 1-25 are stitched into a three-dimensional shape by ease stitching, the occurrence of wrinkles can be substantially prevented. In addition, in the composite materials for vehicles of Examples 1-25, there is not a correlation between the maximum easing ratio and the strip modulus. Therefore, the easing properties of the composite materials for vehicles of Examples 1-25 may be attributed to the play structure of the skin material, but not to the flexibility of the composite material.

In Examples 1-10 in which the woven fabric as a skin material had a two-layer weave, the maximum easing ratio is 3% or more in both of the warp and weft directions, and therefore, the composite materials for vehicles of Examples 1-10 may have more excellent easing properties, and may be applicable to various kinds of vehicle interior, such as vehicle seats. In addition, the composite materials for vehicles of Examples 1-10 are all more excellent than those of Examples 11-25 in which the woven fabrics have a single-layer weave in terms of surface abrasion resistance and snagging resistance, and therefore, may be a material more suitable for vehicle interior.

In all of the composite materials for vehicles of Examples 4-7, the skin material has the weave D. Concerning Examples 4 and 5, which are different from each other only in on-machine density and product density, Example 5 having a smaller on-machine density and product density had a greater maximum easing ratio. Therefore, in the case where a woven fabric having a two-layer weave is used as a skin material, as the product density decreases within a range specified in the present disclosure, the space between yarns may increase, resulting in an improvement in easing properties.

In the case where the yarn used in the skin material of the composite material for vehicles of Example was replaced by an interlaced yarn without changing the total fineness and on-machine density of the skin material (Example 6), substantially the same product density as that of Example 5 was obtained, and the maximum easing ratio was greater than that of Example 5. In addition, the composite material for vehicles of Example 7 having the same yarn combination as that of Example 6 and a smaller on-machine density and product density than those of Example 6, had substantially the same maximum easing ratio as that of Example 6. As a result, in the case where a woven fabric having a two-layer weave is used as a skin material, it is preferable to use an interlaced yarn in order to further improve easing properties.

Examples 1-3 in which two types of warp yarns having different total finenesses were used in a two-layer weave, had the same yarn combinations and the same on-machine density, and substantially the same product density, and were different from each other only in weave, and all had a maximum easing ratio of 3% or more. As a result, the easing properties of the composite materials for vehicles of Examples 1-3 may be attributed to the use of two types of warp yarns having different total finenesses, which provides a play structure formed by the space between adjacent yarns having different total finenesses.

In addition, Examples 8-10 in which the same interlaced yarn was used as warp yarns and weft yarns in a two-layer weave, had the same yarn combination and the same on-machine density, and substantially the same product density, and were different from each other only in weave, and all had a maximum easing ratio of 3% or more. As a result, the easing properties of the composite materials for vehicles of Examples 8-10 may be attributed to the use of interlaced yarns, which provides a play structure formed by the space between interlaced yarns, i.e., the space being derived from the shape of the interlaced yarns.

The composite material for vehicles according to the present disclosure is applicable to vehicle interior applications, and is particularly suitable for vehicle seats, ceiling materials, dashboards, instrument panels, consoles, door linings, and steering wheels, and the like, which have a curved shape.

What is claimed is:

1. A composite material for vehicles which is a layered product of a skin material and a polyurethane foam sheet, wherein
    the skin material has a play structure which, when the composite material for vehicles is stitched, allows the skin material to follow deformation caused by the stitching with a smooth state of a surface of the skin material maintained,
    the skin material is a woven fabric including warp yarns and weft yarns,
    the warp yarns and/or the weft yarns include two or more types of yarns having different total finenesses, and form the play structure,
    the difference between the maximum and minimum values of the different total finenesses of the two or more types of yarns included in the warp yarns is 150 denier or more, and the difference between the maximum and minimum values of the different total finenesses of the two or more types of yarns included in the weft yarns is 150 denier or more.

2. The composite material for vehicles of claim 1, wherein the warp yarns have a total fineness of 150-300 denier, and
the weft yarns have a total fineness of 100-450 denier.

3. The composite material for vehicles of claim 1, wherein the warp yarns have a product density of 70-250 yarns/25.4 mm, and
the weft yarns have a product density of 55-160 yarns/25.4 mm.

4. The composite material for vehicles of claim 1, wherein the warp yarns have a product density of 70-250 yarns/25.4 mm, and
the weft yarns have a product density of 55-160 yarns/25.4 mm.

5. The composite material for vehicles of claim 1, wherein the warp yarns and/or the weft yarns have a float length of 10 or less.

6. The composite material for vehicles of claim 1, wherein the warp yarns and/or the weft yarns have a float length of 10 or less.

7. The composite material for vehicles of claim 1, wherein the warp yarns and/or the weft yarns are an interlaced yarn.

8. The composite material for vehicles of claim 1, wherein the warp yarns and/or the weft yarns are an interlaced yarn.

* * * * *

UNITED STATES PATENT AND TRADEMARK OFFICE
CERTIFICATE OF CORRECTION

PATENT NO. : 11,597,180 B2
APPLICATION NO. : 16/906307
DATED : March 7, 2023
INVENTOR(S) : Naohiro Wada et al.

It is certified that error appears in the above-identified patent and that said Letters Patent is hereby corrected as shown below:

In the Specification

Column 1, Line 12, "as the s kin material of" should be --as the skin material of--

Column 2, Line 35, "and therefore, occurence" should be --and therefore, the occurrence--

Column 2, Line 62, "yarns are in above" should be --yarns are in the above--

Column 3, Line 29, "present disclosure is" should be --the present disclosure is--

Column 7, Line 23, "where the arab width" should be --where the grab width--

Column 8, Line 18, "as a in material in" should be --as a skin material in--

Column 8, Line 22, "yarns was yarns/25.4" should be --yarns was 62 yarns/25.4--

Column 13, Line 57, "of Example was replaced" should be --of Example 5 was replaced--

Signed and Sealed this
Seventh Day of November, 2023

Katherine Kelly Vidal
*Director of the United States Patent and Trademark Office*